June 16, 1959

R. D. RUNCIMAN 2,890,456

AUTOMATIC MACHINES

Filed April 2, 1957

INVENTOR
ROBERT DAVIDSON RUNCIMAN
BY
Auschstein, Auschstein & Ottinger
ATTORNEYS June 16, 1959  R. D. RUNCIMAN  2,890,456
AUTOMATIC MACHINES Filed April 2, 1957  2 Sheets-Sheet 2

INVENTOR
ROBERT DAVIDSON RUNCIMAN
BY
Fischstein, Fischstein & Hinges
ATTORNEYS

United States Patent Office 2,890,456
Patented June 16, 1959

2,890,456

AUTOMATIC MACHINES

Robert Davidson Runciman, Coventry, England, assignor to The General Electric Company Limited, London, England Application April 2, 1957, Serial No. 650,145

Claims priority, application Great Britain April 5, 1956

5 Claims. (Cl. 1—102)

This invention relates to automatic machines.

More particularly the invention relates to automatic machines for performing a sequence of operations on a plurality of articles wherein each article is moved automatically so as to be presented in sequence to a series of stations at each of which the article has an operation performed on it by an operating head. It is to be understood that in this specification the term article includes the combination of an article and a carrier to which the article is temporarily attached. Machines of this kind, for example, are used in the radio and electronics industry for the automatic mounting of electrical components on printed bases. By a printed base is meant an insulating base on the surface of which is formed a thin metallic pattern, said pattern constituting at least part of the conductive connections for an electrical circuit.

An essential requirement of a machine of this kind is a means for accurately positioning each article in relation to each operating head to which it is presented. Hitherto it has been a common practice to convey each article from station to station and lock the article in position at each station by means of conical positioning pegs which are brought into engagement with reference holes in the article. A machine having this kind of positioning means has certain disadvantages; it is expensive to make and there is a tendency for wear of the positioning means to occur. Wear of this nature will obviously cause a decrease in the accuracy with which the articles can be positioned with respect to the operating heads, and this accuracy may eventually fall outside the limits required for successful operation of the machine.

It is an object of the present invention to provide an automatic machine in which the above-mentioned disadvantages are substantially overcome.

According to the invention, there is provided an automatic machine for performing a sequence of operations on a plurality of articles of identical length, including a track along which a number of the articles, abutting end to end, can be pushed, operating heads arranged to perform said operations and which are positioned at intervals along the track, means for pushing the articles along the track, a stop, near the end of the track towards which the articles on the track are pushed, which enables a line of articles, constituted at least partly by the articles on the track, to be locked in position by pushing the line of articles against the stop, and means for controlling the operating heads so that said operations are performed while said line of articles is locked in position by being pushed agaist the stop.

It will be appreciated that as all the articles are of the same length then the act of pushing a line of them against the stop accurately locks the articles in the line in position, and the removal of the article in contact with the stop enables the rest of the articles in the line to move along a distance equal to the length of an article. The accuracy to which the articles can be positioned on this machine is therefore limited only by any variation in the length of the articles, and as little wear takes place on the ends of the articles the machine will maintain a high accuracy of positioning of the articles for a lengthy period. Other advantages of a machine in accordance with the invention are that it is relatively simple in design and cheap to manufacture.

According to one aspect of the invention, there is provided an automatic machine for mounting electrical components on printed bases, including a plurality of platens of identical length to each of which a printed base can be attached, means for automatically circulating all the platens simultaneously around a closed circuit which includes a track along which a number of the platens, abutting end to end, can be pushed, said means including means for pushing the platens along said track, means for loading the printed bases on to the platens at the end of the track from which the platens are pushed, means for unloading the printed bases from the platens at the opposite end of the track, operating heads, each arranged to mount at least one component on a printed base, which are positioned at intervals along the track, a stop, near the end of the track towards which the platens are pushed, which enables a line of the platens, constituted at least partly by the platens on the track, to be locked in position by pushing the line of platens against the stop, and means for controlling the operating heads so that components are mounted on the printed bases only while said line of platens is locked in position by being pushed against the stop.

One arrangement in accordance with the present invention will now be described by way of example with reference to the accompanying drawings in which.

Figure 1:
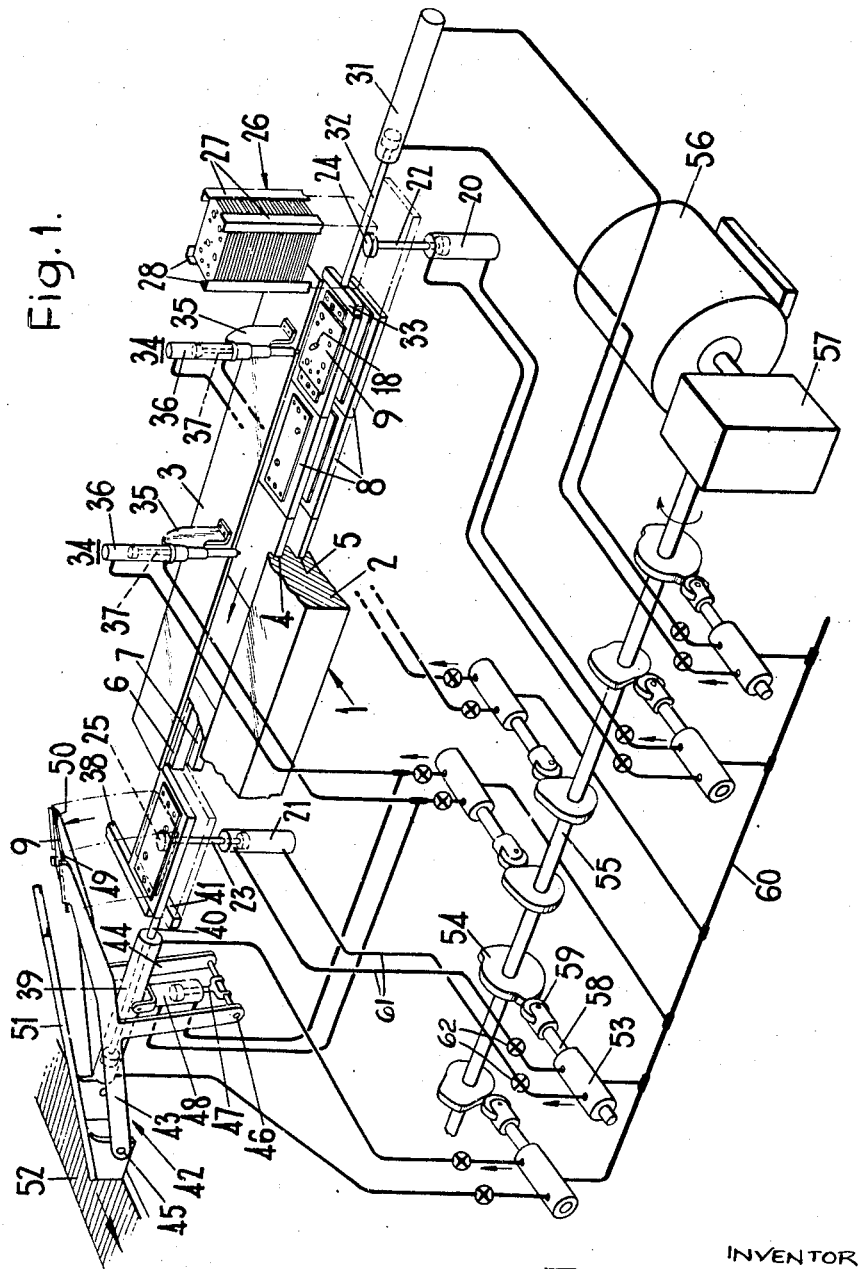
Figure 1 is a diagrammatic perspective view of an automatic machine for the automatic mounting of electrical components on printed bases.

Referring now to the drawings, the machine includes a base, generally designated 1, the sides of which are constituted by two cast iron side members 2 and 3, the member 2 having formed in it two horizontal grooves 4 and 5 arranged one vertically above the other and running the whole length of the base 1 of the machine, and the member 3 having two similar horizontal grooves 6 and 7 arranged one vertically above the other and running the whole length of the base 1 of the machine.

Figure 2:
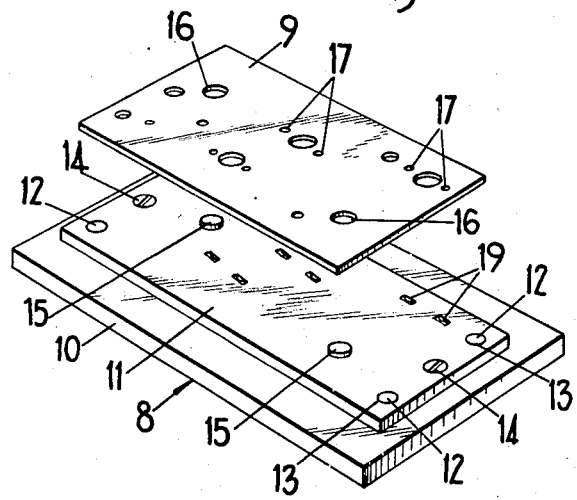
Figure 2 is an enlarged exploded view of the combination of a printed base and a platen as shown in Figure 1.

The machine also includes a set of identical rectangular steel platens, generally designated 8, each of which is designed to carry a printed base 9. Referring now especially to Figure 2 of the drawings, each platen 8 consists of a flat rectangular plate 10, 0.25 inch thick, to the top face of which a rectangular anvil plate 11 is attached; the anvil plate 11 is narrower and slightly shorter in length than the plate 10 and is symmetrically disposed with respect to the plate 10, the anvil plate 11 being accurately located with respect to the plate 10 by means of four pegs 12 projecting from the upper surface of the plate 10 which engage in mating holes 13 provided in the anvil plate 11, and the anvil plate 11 being secured to the plate 10 by means of two screws 14. The upper surface of the anvil plate 11 is provided with two locating pegs 15 which fit in two mating holes 16 provided in the printed base 9 and thereby accurately locate the printed base 9 with respect to the platen 8. The printed base 9 is also provided with a number of pairs of small holes 17 which are designed to accommodate the leads of electrical components (such as the component 18 shown in Figure 1) designed to be mounted on the printed base 9 by means of the machine. The upper face of the anvil plate 11 is provided with a number of pairs of concave grooves 19 which correspond in position to the holes 17 in the printed base 9, the arrangement being such that, with the printed base 9 located in position on the platen 8, when the lead wires of a component 18 are inserted in a pair of holes 17 of the printed base 9 the ends of the lead wires strike the outer ends of the corresponding pair of grooves 19 and are thereby crimped inwards.

Figure 3:
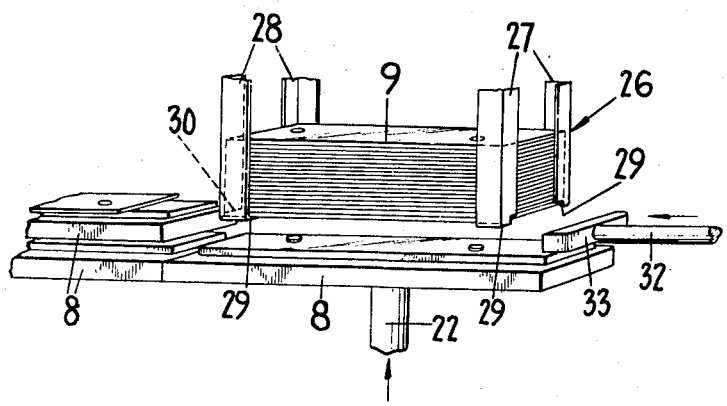
Figure 3 is an enlarged view of the loading arrangement of the machine shown in Figure 1.

The top grooves 4 and 6 in the two side members 2 and 3 of the base 1 of the machine together form a track along which each of the platens 8 can slide freely, with the pegs 15 projecting upwards, in a horizontal plane and without appreciable lateral movement. Two vertical double-acting air cylinders 20 and 21 are respectively disposed adjacent the ends of the track constituted by the grooves 4 and 6 formed in the side members 2 and 3 of the base 1 of the machine. The air cylinders 20 and 21 are respectively associated with two piston rods 22 and 23 which are arranged to be forced vertically upward from the cylinders 20 and 21, the upper ends of the piston rods 22 and 23 being respectively formed as two flat support members 24 and 25. A holder, generally designated 26, for a stack of the printed bases 9 is provided near the end of the track constituted by the grooves 4 and 6 adjacent the air cylinder 20. As shown in detail in Figure 3, the holder 26 includes two pairs of angle pieces 27 and 28 which are arranged to constrain the stack of printed bases 9 so that the printed bases 9 are disposed vertically one above the other with their long edges parallel to the length of, and symmetrically disposed with respect to, the grooves 4 and 6. The bottom ends of the sides of the pairs of angle pieces 27 and 28 which are parallel to the lengths of the grooves 4 and 6 are respectively formed as inwardly projecting flanges 29 which support the stack of printed bases 9. The lower ends of the sides of the pair of angle pieces 28 disposed transverse to the length of the grooves 4 and 6 are cut away so as respectively to form two slots 30; the height of each slot 30 is such as to allow the bottom printed base 9 only of the stack of printed bases 9 in the holder 26 to be slid in a horizontal direction through the slot 30 and into the track constituted by the grooves 4 and 6, and, when the bottom printed base 9 is removed, the stack of printed bases 9 move vertically downwards under gravity by a distance equal to the thickness of a printed base 9.

A horizontal double-acting air cylinder 31 is disposed adjacent the same end of the track constituted by the groves 4 and 6 as the holder 26. The air cylinder 31 is associated with a piston rod 32, the free end of the piston rod 32 being formed as a ram 33 which is arranged to push a line of the platens 8 abutting end to end along the track constituted by the grooves 4 and 6 away from the holder 26. At intervals along the track constituted by the grooves 4 and 6 are positioned conventional operating heads 34 each of which is designed to mount one electrical component 18 on a printed base 9, carried by a platen 8 in the track constituted by the grooves 4 and 6, by inserting the leads of the component 18 into the relevant pair of holes 17 provided in the printed base 9; each operating head 34 is secured to the side member 3 by means of a support member 35 and is arranged to be operated by means of a vertical double-acting air cylinder 36 associated with a piston rod 37. It will be appreciated that conventional feeding mechanisms (not shown) would be provided for the machine for causing one component 18 at a time to be fed into each operating head 34. A stop 38 is provided at the end of the track constituted by the grooves 4 and 6 remote from the holder 26 so as to enable a line of the platens 8, including the platens 8 in this track, to be locked in position by pushing the line of platens 8 against the stop 38 by means of the ram 33. The stop 38 is positioned at a distance slightly greater than the length of a platen 8 from the adjacent end of the track constituted by the grooves 4 and 6, so that a platen 8 in contact with the stop 38 will not be in engagement with the grooves 4 and 6 constituting this track, but is arranged to be supported by the support member 25.

The lower grooves 5 and 7 in the two side members 2 and 3 of the base 1 of the machine together form a second track along which a line of platens 8 can be pushed to the end of this track adjacent the holder 26. A horizontal double-acting air cylinder 39 is provided at the end of the track constituted by the grooves 5 and 7 remote from the holder 26, the air cylinder 39 being associated with a piston rod 40; the free end of the piston rod 40 is formed as a ram 41 which is arranged to push a line of the platens 8 in the track constituted by the grooves 5 and 7 towards the end of this track adjacent the holder 26. The piston rod 23 associated with the air cylinder 21 is designed to lower one platen 8 at a time from the level of the upper track constituted by the grooves 4 and 6 to the level of the lower track constituted by the grooves 5 and 7, while the piston rod 22 associated with the air cylinder 20 is designed to raise one platen 8 at a time from the level of the lower track constituted by the grooves 5 and 7 to the level of the upper track constituted by the grooves 4 and 6. The platens 8 in both these upper and lower tracks abut end to end along the whole length of both tracks, and while the machine is in operation there is always a platen 8 on one or other of the support members 24 and 25.

A scoop, generally designated 42, is provided adjacent the stop 38, the scoop 42 being designed to remove a printed base 9 from a platen 8 which is in contact with the stop 38. The scoop 42 includes two vertical T-shaped side members 43 and 44, the ends of the cross-bars of the T-shaped side members 43 and 44 remote from the base 1 of the machine being pivoted about a fixed horizontal spindle 45. The lower ends of the uprights of the T-shaped side members 43 and 44 are pivoted about a spindle 46 and the free end of a piston rod 47 associated with a double-acting air cylinder 48 is pivotably secured to the spindle 46; the upper end of the air cylinder 48, which is remote from the end of the piston 47 secured to the spindle 46, is pivotably secured to the air cylinder 39. The ends of the cross-bars of the T-shaped side members 43 and 44 adjacent the base 1 of the machine are respectively provided with inwardly projecting lips 49 and 50 the distance apart of adjacent ends of the lips 49 and 50 being slightly greater than the width of an anvil plate 11 and slightly less than the width of a printed base 9. Immediately prior to a line of the platens 8 being pushed against the stop 38, the scoop 42 is arranged to be rotated in a clockwise direction (with reference to Figure 1 of the drawings) about the spindle 45 by means of the piston rod 47 associated with the air cylinder 48 so that the lips 49 and 50 are lowered until the lower surfaces of the lips 49 and 50 are level with the upper surfaces of the platens 8 in the track constituted by the grooves 4 and 6; thus, when a line of platens 8, including the platens 8 in the track constituted by the grooves 4 and 6, is pushed against the stop 38, the long edges of the printed base 9 carried by the platen 8 nearest the stop 38 will slide over the lips 49 and 50. While this line of platens 8 is locked in position by being pushed against the stop 38, the scoop 42 is arranged to be pivoted in an anti-clockwise direction (with reference to Figure 1 of the drawings) so that the lips 49 and 50 are raised carrying with them the printed base 9 which, prior to this rotation of the scoop 42, had been carried by the platen in contact with the stop 38; the arrangement is such that when the piston rod 47 has been forced into the air cylinder 48 to its greatest extent the printed base 9 carried by the scoop 42 slides off the lips 49 and 50 and on to a chute 51, the upper end of the chute 51 being arranged to be adjacent the lips 49 and 50 when they are in their highest position. A printed base 9 delivered on to the chute 51 slides down the chute 51 on to a conveyor belt 52 which is disposed adjacent the lower end of the chute 51.

The operation of the air cylinders 20, 21, 31, 36, 39 and 48 is arranged to be controlled by a number of air valves 53 which are in turn operated by a number of cams 54 mounted on a camshaft 55, the camshaft 55 being arranged to be rotated by an electric motor 56 via a reduction gear box 57. Each air valve 53 is associated with a valve plunger 58, and a follower roller 59 is mounted at the end of each plunger 58 furthest from the relevant valve 53, each follower roller 59 being arranged to bear against the relevant cam 54. Air is arranged to be supplied to the air valves 53 via pipe lines 60 and air from the air valves 53 is arranged to be supplied to the corresponding air cylinders 20, 21, 31, 36, 39 and 48 by means of the pipe lines 61. The pipe lines 61 are respectively provided with one way control valves 62 which are so designed that, although the air supplied to each cylinder 20, 21, 31, 36, 39 or 48 from the relevant valve 53 is unrestricted, the exhaust from each cylinder 20, 21, 31, 36, 39 or 48 is controlled by the relevant control valve 62 so that the speed of the stroke of the relevant piston rod 22, 23, 32, 37, 40, or 47 is accurately controlled.

The operation of the machine will now be described. The design and arrangement of the cams 54 is such that, for half a revolution of the camshaft 55, the support members 24 and 25 are held at the level of the upper track constituted by the grooves 4 and 6, the support member 25 supporting a platen 8 which is in contact with the stop 38, the piston rod 40 remains withdrawn inside the air cylinder 39, and the platens 8 in the upper track are locked in position between the platen 8 in contact with the stop 38 and the ram 33, the piston rod 32 being forced out to almost its full extent. During this half cycle of the camshaft 55, each operating head 34 inserts a component 18 in the printed base 9 carried by the platen 8 disposed beneath the insertion head 34, and the scoop 42 removes the printed base 9 from the platen 8 in contact with the stop 38 and delivers this printed base 9 to the chute 51. Figure 1 of the accompanying drawings shows the machine during this half cycle of its cycle of operation, with each operating head 34 about to insert a component 18 into the relevant printed base 9 and with the scoop 42 in the process of delivering a printed base 9 to the chute 51. During the next eighth of a revolution, the support members 24 and 25 are lowered to the level of the lower track constituted by the grooves 5 and 7, the support member 25 taking with it an empty platen 8 and the piston rod 32 is forced into the air cylinder 31; during the next eighth of a revolution, the piston rod 40 associated with the horizontal air cylinder 39 is forced out causing a line of platens 8, constituted by the platen 8 on the support 25 and the platens 8 in the lower track constituted by the grooves 5 and 7, to be pushed along a distance equal to the length of a platen 8 towards the loading end of the machine thus causing one platen 8 to be pushed onto the support member 24; during the next eighth of a revolution, the piston rod 40 is forced into the air cylinder 39 and immediately afterwards the two support members 24 and 25 are raised to the level of the upper track constituted by the grooves 4 and 6, the support member 24 taking with it a platen 8 so that the pegs 15, provided on the upper surface of the anvil plate 11 of this platen 8, respectively engage in the pair of holes 16 provided in the printed base 9 disposed at the bottom of the stack of printed bases 9 held in the holder 26; during the last eighth of a revolution, the piston rod 32 associated with the air cylinder 31 is forced out pushing a line of platens 8, constituted by the platen 8 on the support member 24 and the platens 8 in the upper track constituted by the grooves 4 and 6, along a distance equal to the length of a platen 8, the platen 8 in contact with the ram 33 causing the bottom printed base 9 in the holder 26 to be slid from the holder 26 through the slots 30, and thus the platens 8 in this upper track are again locked in position between the platen 8 in contact with the stop 38 and the ram 33.

In the machine described above by way of example, it will be appreciated that the vertical movement of the platens 8 at both ends of the upper track constituted by the grooves 4 and 6 facilitates the automatic loading and unloading of printed bases 9 on to and from the platens 8.

I claim:

1. An automatic machine for performing a sequence of operations on a plurality of articles of identical length, said machine including a track along which a number of the articles abutting end to end can be pushed, operating heads arranged to perform said operations and which are positioned at intervals along the track, a stop fixed relative to the track and positioned near that end of the track towards which the articles on the track are pushed, means for pushing the line of the articles abutting end to end against the stop, the track, the stop and said means for pushing together serving as a means for accurately positioning the articles with respect to the operating heads, and means for controlling the operating heads so that said operations are performed while said line of articles is fixed in position by being pushed against the stop.

2. An automatic machine for mounting electrical components on printed bases, including a plurality of platens of identical length to each of which a printed base can be attached, means for automatically circulating all the platens simultaneously around a closed circuit which includes a track along which a number of the platens abutting end to end can be pushed, said means including means for pushing the platens along said track, means for loading the printed bases on to the platens at the end of the track from which the platens are pushed, means for unloading the printed bases from the platens at the opposite end of the track, operating heads each arranged to mount at least one component on a printed base and positioned at intervals along the track, a stop near the end of the track towards which the platens are pushed, which enables a line of the platens to be locked in position by pushing the line of platens against the stop, and means for controlling the operating heads so that components are mounted on the printed bases only while said line of platens is locked in position by being pushed against the stop.

3. An automatic machine according to claim 2, in which the means for automatically circulating all the platens simultaneously around a closed circuit includes a second track similar to the first track disposed parallel to the first track, means disposed adjacent the end of the first track to which the platens are pushed for conveying one platen at a time from the first track to the second track, means for pushing the platens along the second track in the opposite direction to that in which the platens are pushed along the first track, and means disposed adjacent the end of the first track from which the platens are pushed for conveying one platen at a time from the second track to the first track.

4. An automatic machine according to claim 3, in which the first track is disposed above the second track.

5. An automatic machine according to claim 3, in which the means for pushing the platens along the first track, the means for pushing the platens along the second track, the means for conveying one platen at a time from the first track to the second track, the means for conveying one platen at a time from the second track to the first track, the means for controlling the operating heads, and the means for unloading printed bases from the platens each includes a double-acting air cylinder associated with a piston, the air cylinders being respectively controlled by air valves and the air valves being in turn respectively controlled by means of cams mounted on a common camshaft.

References Cited in the file of this patent

UNITED STATES PATENTS

| | | |
|---|---|---|
| 2,092,099 | Twomley | Sept. 7, 1937 |
| 2,392,169 | Mansfield | Jan. 1, 1946 |
| 2,745,167 | Crass | May 15, 1956 |
| 2,772,416 | Dorosz | Dec. 4, 1956 |
| 2,791,772 | Cardani | May 14, 1957 |